United States Patent
Dichter (10) Patent No.: US 10,138,942 B2
(45) Date of Patent: Nov. 27, 2018

(54) PASSIVE FAULT-TOLERANT SHAFT SEAL CONFIGURATION

(71) Applicant: Aurora Flight Sciences Corporation, Manassas, VA (US)

(72) Inventor: Daniel W. Dichter, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 73 days.

(21) Appl. No.: 15/403,963

(22) Filed: Jan. 11, 2017

(65) Prior Publication Data
US 2018/0195557 A1    Jul. 12, 2018

(51) Int. Cl.
| | | |
|---|---|---|
| *F16C 41/00* | (2006.01) | |
| *F16C 33/78* | (2006.01) | |
| *G01M 3/02* | (2006.01) | |
| *F16C 19/08* | (2006.01) | |

(52) U.S. Cl.
CPC .......... *F16C 33/7886* (2013.01); *F16C 19/08* (2013.01); *F16C 33/7816* (2013.01); *G01M 3/02* (2013.01)

(58) Field of Classification Search
CPC ........ F16C 19/08; F16C 19/18; F16C 19/181; F16C 19/182; F16C 19/183; F16C 19/184; F16C 19/52; F16C 19/546; F16C 19/547; F16C 19/548; F16C 33/7886; F16C 35/045; F16C 35/067; F16C 35/077; F16C 2360/42; F16C 2361/31; F16J 15/16; F16J 15/164; F16J 15/32; F16J 15/3204; F16J 15/3296; G01M 3/186
See application file for complete search history.

(56) References Cited

U.S. PATENT DOCUMENTS

| | | | |
|---|---|---|---|
| 2,510,659 A * | 6/1950 | Ristow | ..................... B60B 5/02 277/563 |
| 3,088,744 A | 8/1960 | Ezekiel et al. | |
| 3,176,996 A | 10/1962 | Barnett | |
| 3,599,990 A | 8/1971 | Greiner et al. | |
| 3,880,434 A | 4/1975 | Echard et al. | |
| 3,934,952 A | 1/1976 | Gardner | |
| 4,477,223 A | 10/1984 | Giroux | |
| 8,585,295 B2 * | 11/2013 | Honda | ..................... F16J 15/43 277/302 |

(Continued)

FOREIGN PATENT DOCUMENTS

WO    2008011554    1/2008

OTHER PUBLICATIONS

The International Search Report and the Written Opinion, dated Apr. 26, 2018, in International application No. PCT/US2018/013077, filed on Jan. 10, 2018.

*Primary Examiner* — Phillip A Johnson
(74) *Attorney, Agent, or Firm* — Michael Stanley Tomsa; McAndrews, Held & Malloy, Ltd.; Eugene H. Nahm (57) ABSTRACT

Disclosed herein is a shaft seal system comprising a first ball bearing, a second ball bearing, a primary shaft seal, and a secondary shaft seal. The secondary shaft seal may be inboard with respect to said primary shaft seal. The shaft seal system can define a leak chamber of a first diameter between said primary shaft seal and a secondary shaft seal. A plurality of O-rings may be further provided between an outer surface of said shaft seal system and said shaft system.

20 Claims, 7 Drawing Sheets

(56) References Cited

U.S. PATENT DOCUMENTS

| | | | |
|---|---|---|---|
| 2002/0090156 A1* | 7/2002 | Kai | B23Q 11/0883 |
| | | | 384/477 |
| 2004/0003968 A1 | 1/2004 | Rakhmailov | |
| 2010/0253005 A1 | 10/2010 | Liarakos et al. | |
| 2011/0048384 A1 | 3/2011 | O'Shea et al. | |
| 2012/0049871 A1* | 3/2012 | Raj | F16J 15/3296 |
| | | | 324/722 |

* cited by examiner

PASSIVE FAULT-TOLERANT SHAFT SEAL CONFIGURATION

STATEMENT OF GOVERNMENT INTEREST

This invention was made with government support under Contract Number: N00024-15-C-4022 awarded by the U.S. Small Business Innovation Research (SBIR) program. The government has certain rights in the invention.

TECHNICAL FIELD

The present invention relates to the field of shaft seals, more specifically, to shaft seals that mitigate leaks while obviating the need for a pump system, even more specifically, to shaft seals for use in pressurized environments where zero or near-zero leakage is acceptable without requiring a pump system.

BACKGROUND

Shaft seals, also known as lip seals, are versatile mechanical components that maintain dynamic seals around rotating components, such as rotating shafts. Common examples of radial and piston shaft seals include, without limitation, strut seals, hydraulic pump seals, axle seals, power steering seals, and valve stem seals. A different seal design for similar applications is called a rotating face seal. The basic working principle of a modern shaft seal is compressing a wear-resistant material, such as an elastomer, against the rotating component using a press-fit, ordinarily with a garter or cantilever spring to provide additional compression.

As the shaft rotates inside the shaft seal, seal material is slowly abraded from the shaft seal, thereby reducing its effectiveness. When a pressure difference exists across the shaft seal (e.g., there is a differential pressure between the two sides of the shaft seal), the wear on the shaft seal will more quickly result in a leak. In the field of surface and sub-sea vehicle design, for example, leakage through the shaft seals is expected and typically addressed by either pumping the leaked fluid back out of the vehicle and/or pumping a lubricant through the shaft seal, thus displacing any water leakage. In many applications, the added complexity of such pump systems is not acceptable or desired due to weight, complexity, and cost; however, a leak mitigation system is nonetheless necessary to extend the service life of the vehicle.

Accordingly, a need exists for a shaft seal that mitigates leaks, such shaft seals being suitable for use in pressurized environments where zero or near-zero leakage is acceptable.

SUMMARY OF THE INVENTION

The present invention is directed to a shaft seal, such as a radial or piston shaft seal, for use in pressurized environments, where zero or near-zero leakage is acceptable. Such shaft seals typically have a useful life that is less than the desired service life of the overall system, therefore, the shaft seal is preferably easily replaced or rebuilt.

According to a first aspect, a shaft system having a cavity and an inboard support comprises: a retaining ring; a shaft seal system positioned within the cavity defined by said shaft system, the shaft seal system being positioned between said inboard support and said retaining ring, wherein the shaft seal system comprises a first ball bearing, a second ball bearing, a primary shaft seal, and a secondary shaft seal, wherein the secondary shaft seal is inboard with respect to said primary shaft seal, wherein said shaft seal system defines a leak chamber of a first diameter between said primary shaft seal and a secondary shaft seal, and wherein said shaft seal system includes a plurality of O-rings between an outer surface of said shaft seal system and said shaft system.

According to a second aspect, a shaft seal system for use in a shaft system comprises: a first ball bearing; a second ball bearing; a primary shaft seal; and a secondary shaft seal, wherein the secondary shaft seal is inboard with respect to said primary shaft seal, wherein said shaft seal system defines a leak chamber of a first diameter between said primary shaft seal and a secondary shaft seal, and wherein said shaft seal system includes a plurality of O-rings between an outer surface of said shaft seal system and said shaft system.

In certain aspects, the shaft seal system includes a housing for said first ball bearing and said second ball bearing.

In certain aspects, the primary shaft seal and the secondary shaft seal are fabricated from an elastomer.

In certain aspects, the elastomer include one or more elastomers chosen from a group of FKM, ACM, NBR, HNBR, AEM, PTFE, PEEK, TPU, EPDM, and/or MVQ.

In certain aspects, the housing is fabricated from a metallic material.

In certain aspects, the housing is fabricated from a plastic material.

In certain aspects, the leak chamber includes one or more sensors to monitor a parameter of the shaft seal system.

In certain aspects, the one or more sensors includes a leak sensor or pressure sensor.

In certain aspects, the parameter of the shaft seal system is communicated to a seal monitoring system.

In certain aspects, the seal monitoring system is communicatively coupled with a user terminal.

In certain aspects, the user terminal is a portable user device.

In certain aspects, the user terminal displays a status of a plurality of seal systems.

In certain aspects, the status includes a current status, a remaining useful life, and a recommended course of action.

In certain aspects, the seal monitoring system is communicatively coupled with the user terminal via the Internet.

DESCRIPTION OF THE DRAWINGS

These and other advantages of the present invention can be readily understood with reference to the following specifications and attached drawings wherein:

FIG. 1b illustrates a cross sectional view of the shaft seal system of FIG. 1a.

FIG. 2b illustrates an isometric cross-sectional assembly view of the shaft seal system of FIG. 2a.

FIG. 3b illustrates a side view of the example secondary housing of FIG. 3a.

FIG. 3c illustrates a side cross-sectional view of the example secondary housing of FIG. 3a.

DETAILED DESCRIPTION

Preferred embodiments of the present invention are described hereinbelow with reference to the accompanying drawings. In the following description, well-known functions or constructions are not described in detail because they may obscure the invention in unnecessary detail. For this disclosure, the following terms and definitions shall apply.

The term "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y, and z."

The terms "about" and "approximately," when used to modify or describe a value (or range of values), mean reasonably close to that value or range of values. Thus, the embodiments described herein are not limited to only the recited values and ranges of values, but rather should include reasonably workable deviations The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "exemplary" means serving as a non-limiting example, instance, or illustration. Similarly, as utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

The term "network" as used herein includes both networks and inter-networks of all kinds, including the Internet, and is not limited to any particular network or inter-network.

The term "processor" as used herein means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing.

Figure 1A:
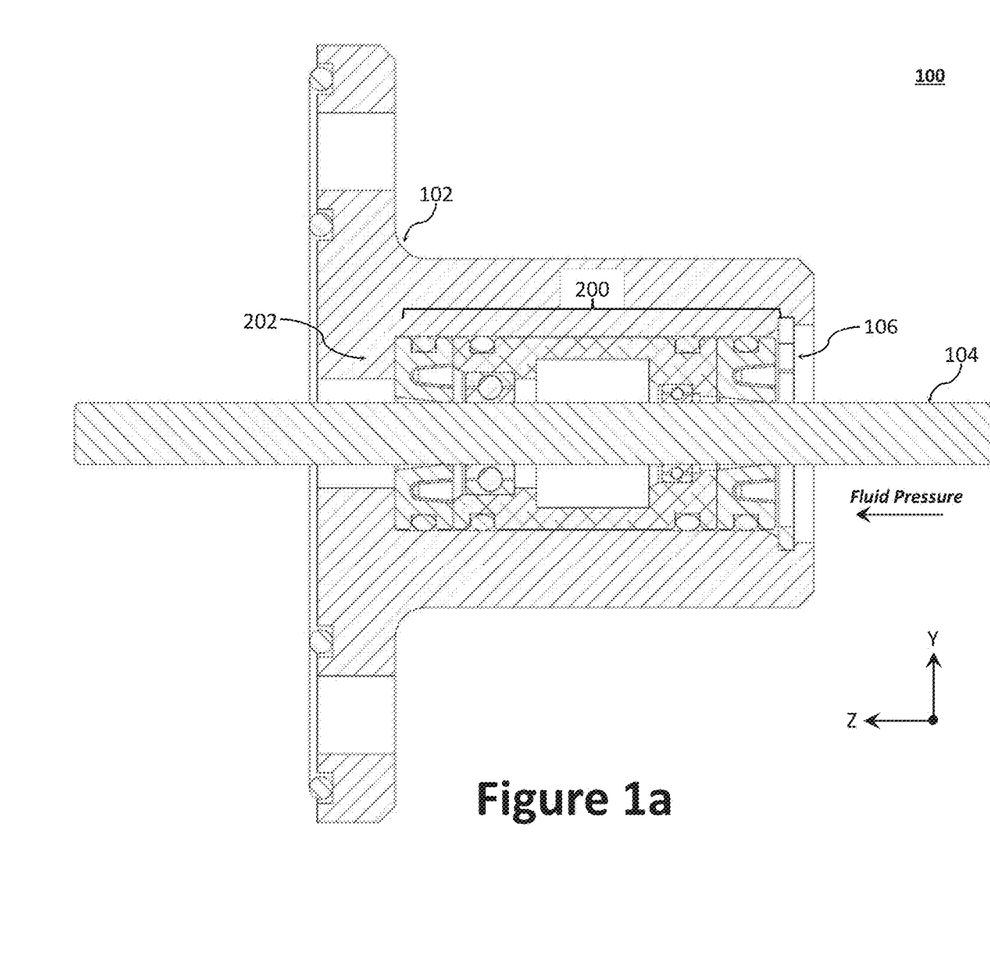
FIG. 1a illustrates a cross sectional view of an example radial shaft system having a shaft seal system.
Figure 1B:
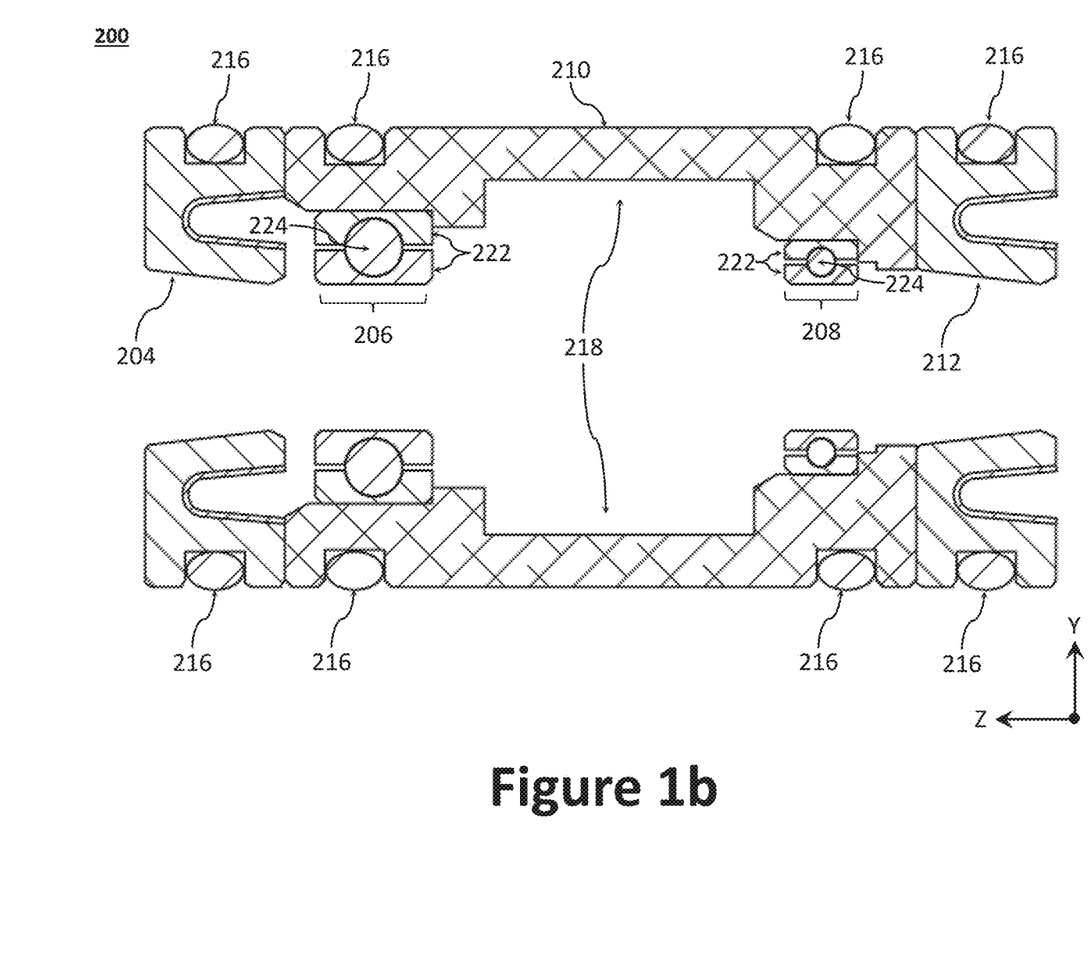

The present invention is directed to a shaft seal, such as a radial or piston shaft seal, for use in pressurized environments where zero or near-zero leakage is acceptable. FIGS. 1a and 1b illustrate, respectively, cross sectional views of an example shaft system 100 and a shaft seal system 200. As illustrated in FIG. 1a, the shaft system 100 generally comprises an outer housing 102, a rotating shaft 104, and a shaft seal system 200. The shaft seal system 200 is positioned within the outer housing 102 and secured by a retaining device 106 (e.g., a retaining ring). The rotating shaft 104 passes through the shaft seal system 200 and the outer housing 102. In operation, the shaft seal system 200 serves to prohibit leakage adjacent the shaft using a plurality of seals. For example, with reference to FIG. 1a, the shaft seal system 200 prohibits inboard leakage in the direction of the fluid pressure from right (i.e., the outer environment) to left (i.e., within the shaft system 100). FIG. 1b illustrates the shaft seal system 200 of FIG. 1a with the outer housing 102, the rotating shaft 104, and the retaining device 106 omitted.

The shaft seal system 200 may be employed in, for example, radial shaft systems 100 that employ shaft seals in pressurized environments where fluid leakage could result in a catastrophic failure of the overall system. Because a pumping system is not required, the shaft seal system 200 is particularly well suited for radial shaft systems 100 used in short duration operations and short operating lives where the radial shaft system's 100 vehicle is disposable or because it will be serviced at regular intervals. Potential applications include, without limitation, undersea munitions (e.g., torpedoes), unmanned undersea vehicles (UUVs), propeller-driven surface vehicles, amphibious vehicles, remote fluid handling systems, and hazardous environments (HAZMAT).

Figure 2A:
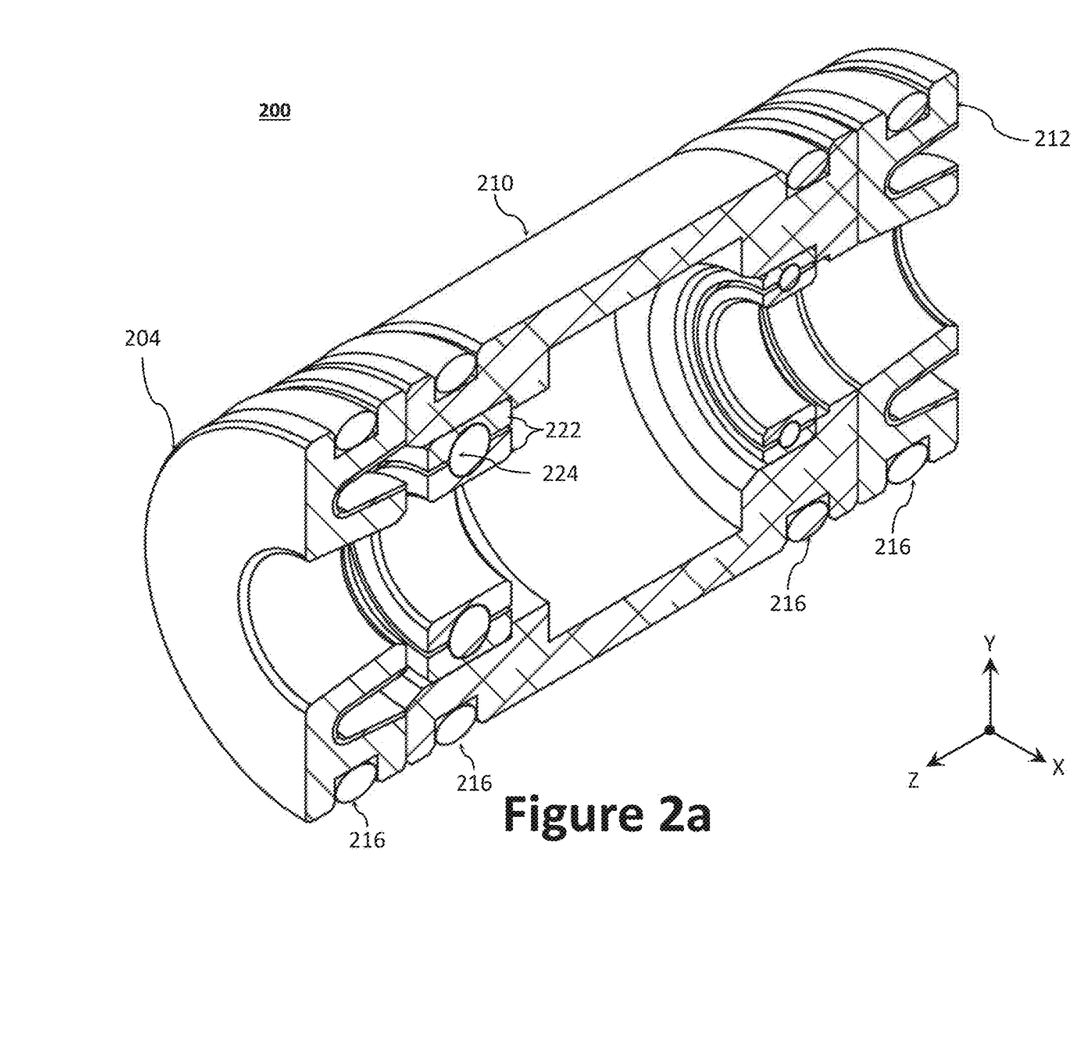
FIG. 2a illustrates an isometric cross-sectional view of an example shaft seal system.
Figure 2B:
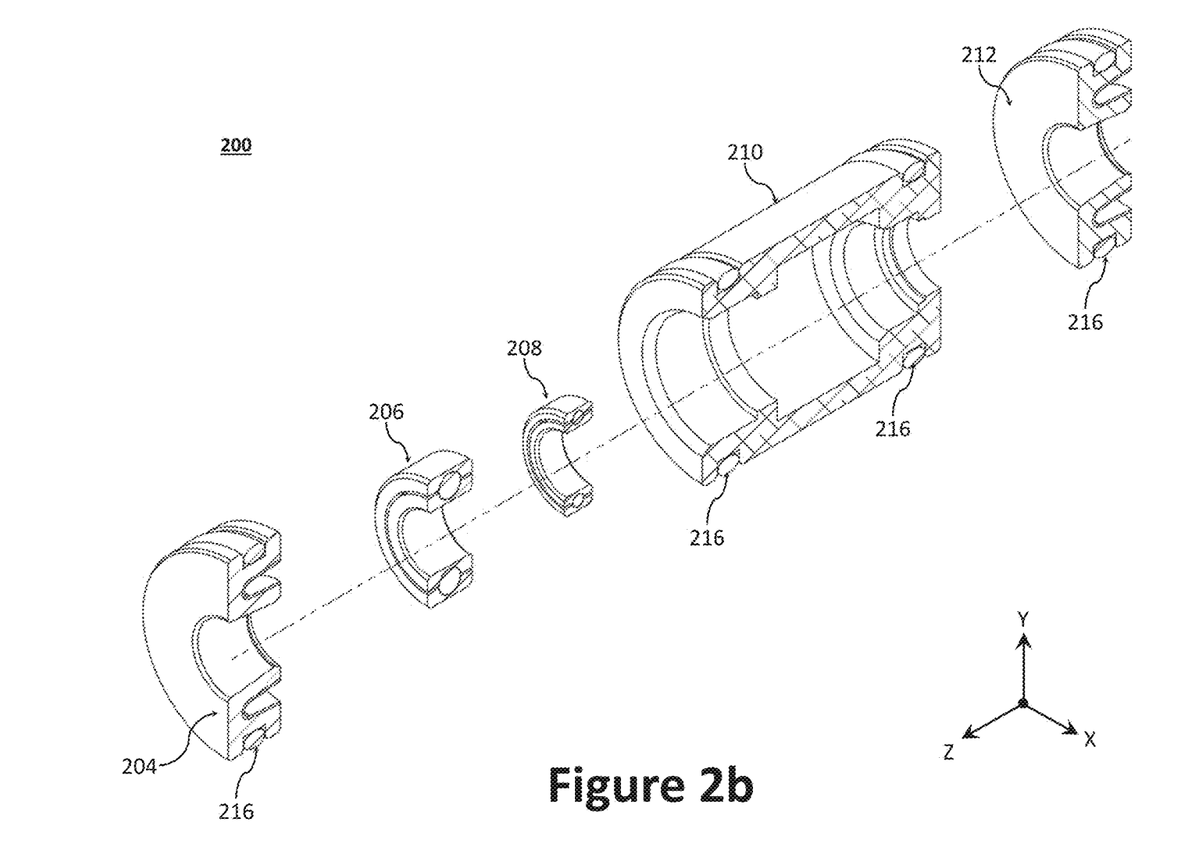

FIGS. 2a and 2b illustrate, respectively, an isometric cross-sectional view and an isometric cross-sectional assembly view of an example shaft seal system 200. As illustrated, the shaft seal system 200 generally comprises a secondary shaft seal 204, a first ball bearing 206, a second ball bearing 208, a primary shaft seal 212, a housing 210, and a plurality of O-rings 216. While the outer diameter of the shaft seal system 200 is illustrated as circular, other shapes are contemplated, such as polygons. Moreover, while two shaft seals (i.e., primary shaft seal 212 and a secondary shaft seal 204) are illustrated, the life of the shaft seal system 200 may be further extended by include additional shaft seals, such as a third, fourth, fifth, etc.

The shaft seal system 200 is secured within a cavity defined by the shaft system 100 via, and between, the inboard support 202 (e.g., a ledge) and the retaining device 106. In certain aspects, a support washer may be positioned between the inboard support 202 and the shaft seal system 200 to support the backside of the shaft seal system 200, such that the shaft seal system 200 is fitted within the cavity. A support washer may be desirable where it is desirable to avoid any changes to an existing housing 102 (e.g., where the diameter of the housing 102 cannot be modified to define an inboard support 202 to support the shaft seal system 200). The inboard support 202 prohibits the shaft seal system 200 from shifting too far within the shaft system's 100 cavity, while the retaining device 106 secures the shaft seal system 200 in place within the cavity. Due to wear and tear over time, the shaft seal system 200 is expected to have a useful life that is less than the desired service life of the overall shaft system 100, therefore, the shaft seal system 200 is preferably easily replaced or serviced, which may entail periodic removal of the shaft seal system 200 from the shaft system 100. To that end, the retaining device 106 may be removable and/or replaceable to facilitate quick replacement of the shaft seal system 200 and/or components thereof. The retaining device 106 may be removably secured in place using one or more clips, screws, bolts, etc. In certain aspects, the need for the retaining device 106 may be obviated by instead using a fastening device, such as clips, screws, bolts, etc.

In certain aspects, the retaining device 106 may be threaded at its perimeter and configured (e.g., sized and shaped) to mate with corresponding threads on an inner surface of the cavity defined by the shaft system 100. To mitigate any loosening caused by the rotation of the rotating shaft 104 and/or rotation-induced vibration, a thread-locking feature (e.g., Nylock patches, castle nuts, or Loc-Tite) may be used to prohibit unwanted loosening of the retaining device 106 during operation.

As illustrated, the housing 210 may be fabricated to house the first ball bearing 206 and the second ball bearing 208, while the primary shaft seal 212 and the secondary shaft seal 204 are positioned on each side of the housing 210 within the shaft system 100. As illustrated, the housing 210 includes a hollow region around the rotating shaft 104 that defines a leak chamber 218 between the secondary shaft seal 204 and the primary shaft seal 212.

The primary shaft seal 212 and the secondary shaft seal 204 may be fabricated from one or more of a plurality of seal materials, such as an elastomer. Suitable elastomers include, inter alia, FKM, ACM, NBR, HNBR, ethylene acrylic rubber (AEM), PTFE, polyether ether ketone (PEEK), TPU, EPDM, and/or methyl silicone rubber (MVQ). Moreover, additives, such as carbon fiber and graphite, can be mixed into these materials to form proprietary blends. To provide increased wear resistance, the durometer (hardness) of the primary shaft seal 212 and/or the secondary shaft seal 204 may be about Rockwell B (HRB) 75-Rockwell C (HRC) 70. Hardness is a primary material property of importance for the shaft 104. You can reach this hardness by a combination of material selection and coating selection. For materials: steel, titanium, and aluminum are feasible options; for coatings: anodization, chrome-oxide, and electro-less nickel. Certain coatings can only be used with certain materials (e.g., steel cannot be anodized).

The shaft seal system 200 may be designed such that the primary shaft seal 212 and the secondary shaft seal 204 may be readily replaced. The primary shaft seal 212 and the secondary shaft seal 204 may include a sprung main sealing lip that has a point contact with the rotating shaft 104. The point contact can be formed by two angles, with the air side (inward) angle usually less than the sealed side (outward) angle. Depending on the seal type, the two angles may be varied to create a pressure distribution at the seal contact point that has a steeper slope on the sealed side of the primary shaft seal 212 or secondary shaft seal 204. The shallower the slope on the sealed side of the seal the wetter the seal will run. The spring may be positioned such that axially the centerline of the spring is biased to the air side of the lip contact point. Example seal types include: a rubber covered outer diameter with metal insert and sealing lip with garter spring; a rubber covered outer diameter with metal insert and sealing lip with garter spring and additional dust lip; an outer metal case, sealing lip with garter spring; an outer metal case with sealing lip with garter spring and additional dust lip; an outer metal case with reinforcing cap and sealing lip with garter spring; an outer metal case with reinforcing cap having a sealing lip with garter spring and additional dust lip; and a reinforced sealing lip for overpressure, with additional dust lip. Other suitable spring include cantilever springs and stretched O-rings.

The housing 210 may be fabricated from one or more metallic or nonmetallic materials. Example metallic materials include brass, copper alloys, aluminum, steel, alloy steel, stainless steel, titanium, etc. Example nonmetallic materials include plastics and other resins. By providing the housing 210 as a separate component from the secondary shaft seal 204 and primary shaft seal 212, a user may more readily replace or substitute one component without having to replace the other components, which may still be useable. In certain aspects, the housing 210 may be further configured to house one or both of the secondary shaft seal 204, the primary shaft seal 212, or other components. Alternatively, the housing 210 may be provided as multiple sub-housings where, for example, the housing 210 may be provided as separate sub-housings for one or more of the primary shaft seal 212, the secondary shaft seal 204, the first ball bearing 206, and/or the second ball bearing 208.

The first ball bearing 206 and the second ball bearing 208 reduce rotational friction and support radial and axial loads. The first ball bearing 206 and the second ball bearing 208 use at least two races 222 to contain a plurality of balls 224 and transmit loads through the balls 224. One race 222 is preferably stationary (e.g., the outer race may be coupled to the housing 210), while the other race 222 is attached to the rotating assembly (e.g., rotating shaft 104). The races 222 may be coupled to the housing 210 or the rotating shaft 104 via a press fit, or alternately, with a bonding agent. As one of the bearing races 222 rotates, it causes the balls 224 to rotate as well. The balls 224 within the first ball bearing 206 and the second ball bearing 208, because of their ability to roll, have a much lower coefficient of friction than two flat surfaces sliding against each other. Ball bearings are also advantageous in that they can tolerate misalignment of the inner and outer races 222. The ball bearings are useful in designs that are subject to high speeds and high pressure, however other friction reducing components may be used in lieu of ball bearings. For example, in some less extreme cases (e.g., designs that are subject to relatively lower speeds and/or lower pressure), it is feasible to replace the ball bearings with sleeve bearings. In even less extreme cases, the ball bearings may be eliminated, with the shaft seals 204, 212 alone serving doubly as bearings.

The first ball bearing 206 and/or the second ball bearing 208 can be made from many different materials, including: stainless steel, chrome steel, and ceramic (silicon nitride ($Si_3N_4$)). Various ball bearing construction types are possible, including a Conrad-style ball bearing, a slot-fill radial bearing, a relieved race ball bearing, a fractured race ball bearing, a flanged ball bearing, a caged ball bearing, a self-aligning ball bearing. The first ball bearing 206 and/or the second ball bearing 208 may be a single- or multiple-row design (e.g., double-row bearings, triple-row bearings, etc.). A hybrid ball bearing having multiple materials is also contemplated, such as a bearing with ceramic balls and races of metal.

The plurality of O-rings 216 may be positioned within recessed O-ring grooves 220 located along the outer diameter of the housing 210, the primary shaft seal 212, and/or the secondary shaft seal 204 to provide a fluid (e.g., air and liquid) tight seal between the inner surface of the outer housing 102 and the outer surfaces of the housing 210, the primary shaft seal 212, and/or the secondary shaft seal 204. The O-rings 216 may be selected based on chemical compatibility, application temperature, sealing pressure, lubrication requirements, durometer, size, and cost.

The O-rings 216 may be fabricated from, for example, a synthetic rubber or thermoplastic. Example synthetic rubbers include, inter alia: butadiene rubber (BR); butyl rubber (IIR); chlorosulfonated polyethylene (CSM); epichlorohydrin rubber (ECH, ECO); ethylene propylene diene monomer (EPDM); ethylene propylene rubber (EPR); fluoroelastomer (FKM); nitrile rubber (NBR, HNBR, HSN); perfluoroelastomer (FFKM); polyacrylate rubber (ACM); polychloroprene (neoprene) (CR); polyisoprene (IR); polysulfide rubber (PSR); polytetrafluoroethylene (PTFE); sanifluor; silicone rubber (SiR); and styrene-butadiene rubber (SBR). Example thermoplastics include, inter alia: thermoplastic elastomer (TPE) styrenics; thermoplastic polyolefin (TPO) LDPE, HDPE, LLDPE, ULDPE; thermoplastic polyurethane (TPU) polyether, polyester; thermoplastic etheresterelastomers (TEEEs) copolyesters; thermoplastic polyamide (PEBA) polyamides; melt processible rubber (MPR); and thermoplastic vulcanizate (TPV).

Notably, the shaft seal system 200 includes a secondary shaft seal 204 located in-line and inboard of the primary shaft seal 212. When the primary shaft seal 212 reaches the end of its useful life, the primary shaft seal 212 may begin to slowly leak fluid. This leaked fluid will then seep into the leak chamber 218 of the housing 210, but is prevented from proceeding further into the shaft system 100 by the secondary shaft seal 204, which is significantly less-worn than the primary shaft seal 212 because the primary shaft seal 212 has not yet been pressurized. As the primary shaft seal 212 continues to leak, the leak chamber 218 will slowly fill with the leaked fluid. When the leak chamber 218 fills completely (or to a predetermined point), the secondary shaft seal 204 may become pressurized and may begin to wear more quickly. Accordingly, the secondary shaft seal 204 will effectually begin to leak, signaling the end of the overall useful life of the shaft seal system 200, but prolonging the overall life of the shaft seal system 200.

The magnitude of overall life due to the inclusion of the leak chamber 218 and secondary shaft seal 204 depends on many system parameters, including shaft speed, pressure difference, geometry, alignment, and surface finishes. If the leak rate of the primary shaft seal 212 is known (for example, through lab testing), the amount of useful life extension of the shaft seal system 200 can be adjusted by altering the volume of the leak chamber 218, thereby maximizing the useful life of the shaft seal system 200 within broader system constraints (by maximizing the leak chamber 218 volume), or set the overall useful life to some desired length, in which case the shaft seal system would act like a mechanical fuse with a pre-programmed failure criteria.

Figure 3A:
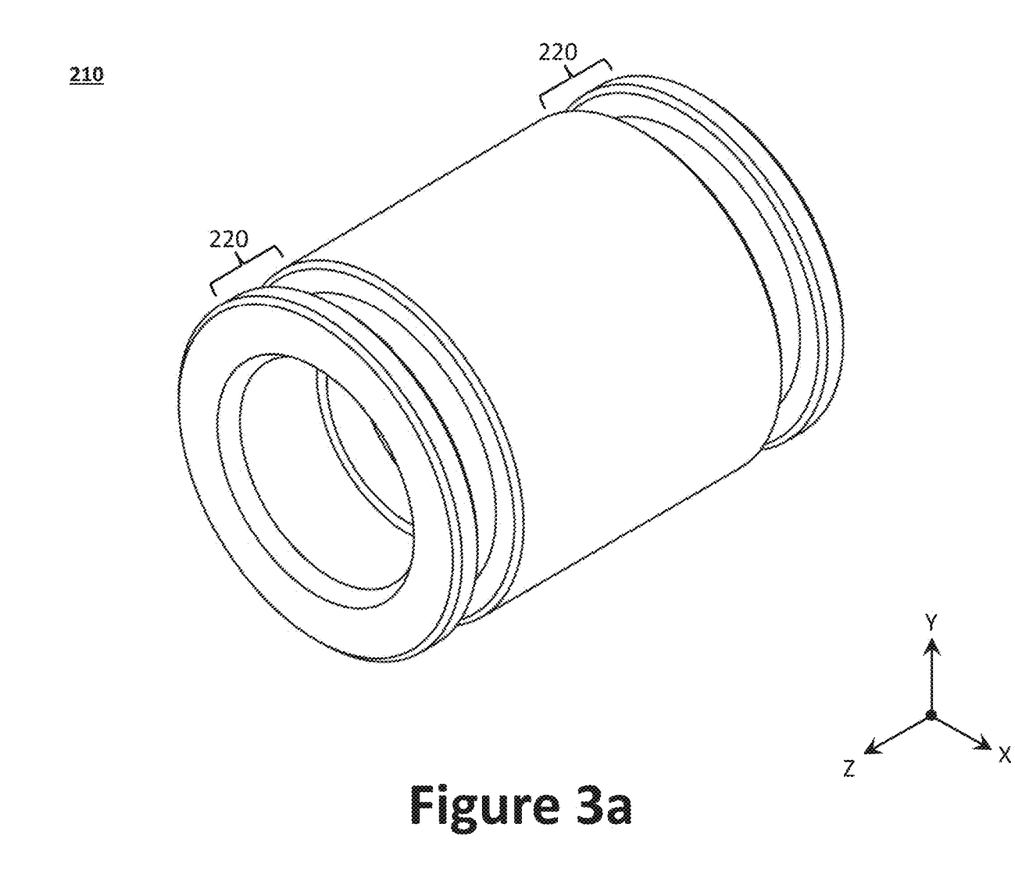
FIG. 3a illustrates an isometric view of an example secondary housing.
Figure 3B:
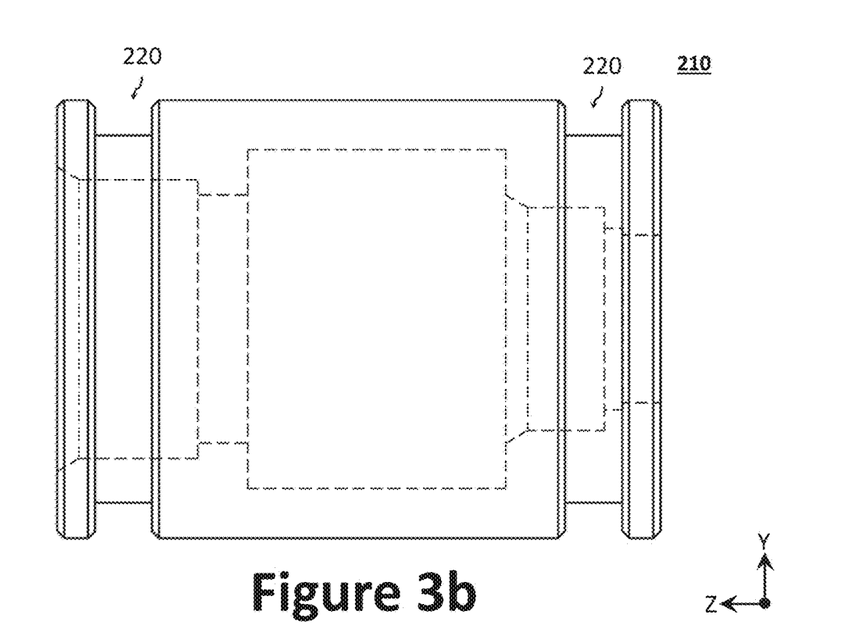
Figure 3C:
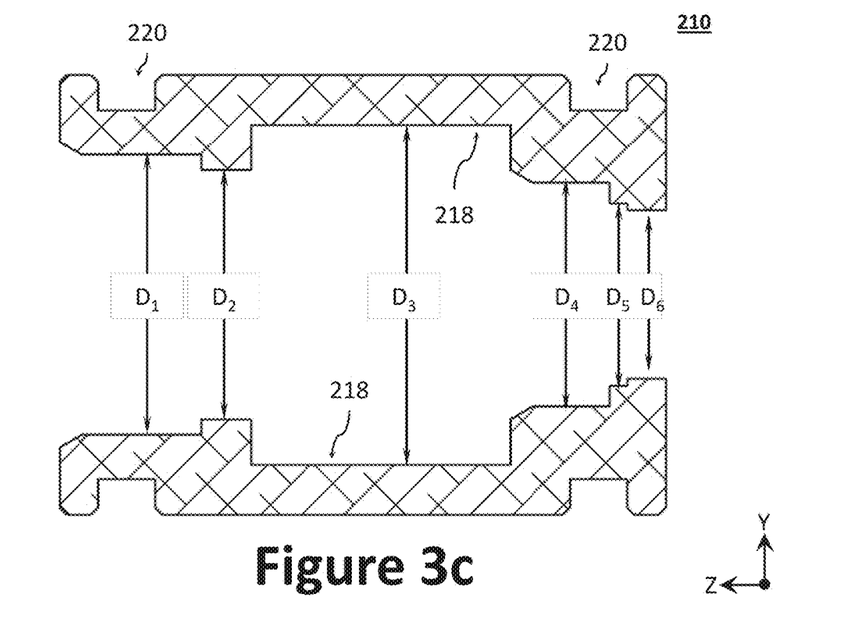

FIGS. 3a through 3c illustrate, respectively, an isometric view, a side view, and a side cross-sectional view of an example housing 210. As illustrated, the inner cavity of the housing 210 is sized and shaped to define multiple inner diameters ($D_1$, $D_2$, $D_3$, $D_4$, $D_5$, $D_6$). $D_1$ may be sized and shaped to correspond to a desired secondary shaft seal 204 or first ball bearing 206. $D_2$ may be sized and shaped to define a seat for the first ball bearing 206 and a desired lateral gap. $D_3$ may be sized and shaped to define a desired leak chamber 218. $D_4$ may be sized and shaped to correspond to a desired second ball bearing 208. $D_5$ may be sized and shaped to define a seat for the second ball bearing 208 and a desired lateral gap. $D_6$ may be sized and shaped to correspond to a desired rotating shaft 104. The inner diameters may be adjusted to meet a particular need. For example, as discussed above, $D_3$ may be adjusted to define a predetermined leak chamber 218.

The shaft seal system 200 offers a number of advantages. First, the shaft seal system 200 may operate passively, thereby obviating the added cost, bulk, and complexity of pumping system. Second, the shaft seal system 200 is self-contained and, therefore, can be replaced as a singular module. Further, the shaft seal system 200 can be packaged compactly, but may be scaled up for larger systems. Third, the shaft seal system 200 does not require electronic hardware, though one or more sensors may be added to enhance usefulness. Fourth, the leak chamber 218 can be sized and shaped to maximize and/or set useful life of the shaft seal system 200. Finally, the geometry of the shaft seal system 200 is neither seal- nor vehicle-specific and, can be adapted to a broad variety of applications. Accordingly, the shaft seal system 200 may be sized and shaped to meet a particular need.

In certain aspects, one or more sensors may be positioned to monitor one or more conditions of the shaft seal system 200. For example, a leak sensor (e.g., a moisture sensor) and/or pressure sensor can be positioned within the leak chamber 218 to monitor a health state of the seal, giving the shaft system 100 an estimate of remaining useful life in the shaft seal system 200 before leakage through the secondary shaft seal 204 occurs. This information would allow the shaft system 100 to maximize its service life based on the health state of the shaft seal system 200. Additionally, a valve could be introduced in the leak chamber 218, allowing a user to periodically drain the leak chamber 218 of leaked fluid as part of a maintenance routine. The shaft seal system 200 is well-suited for certain self-contained systems where zero or near-zero leakage is acceptable, and particularly in systems where it is also preferable to avoid the added complexity, cost, or bulk of a pumping system.

Example pressure sensors include, for example, absolute pressure sensors, gauge pressure sensors, vacuum pressure sensors, and sealed pressure sensors, which man employ one or more pressure-sensing technologies, such as piezoresistive strain gauge, capacitive, electromagnetic, piezoelectric, potentiometric, and optical. Example leak sensors include conductivity sensors, thermometers, hygrometers (moisture sensors), or various gas sensors. The type of sensor may be selected depending on the type of fluid expected to enter into the leak chamber 218. Leads from the leak sensor and/or pressure sensor may exit the leak chamber 218 via a fluid tight hole, such as a compression seal, which can be used to pass wires through a sealed barrier. Another option would be to pass a sensor wire through a drilled hole in the wall of the leak chamber 218, then sealing the hole with a potting agent, such as Room Temperature Vulcanization (RTV) silicone or epoxy. Alternatively, wireless leak sensors and/or pressure sensors may be employed to transmit a signal from within the leak chamber 218, through a wall of the housing 210 to a receiver positioned outside the leak chamber 218. For example, the one or more sensors may be wireless sensors that employ one or more of Bluetooth (e.g., short-wavelength, UHF radio waves in the ISM band from 2.4 to 2.485 GHz), Wi-Fi (e.g., IEEE 802.11), near field communication (NFC), ZigBee (e.g., IEEE 802.15.4), radio frequency (RF), and/or cellular networks.

Figure 4:
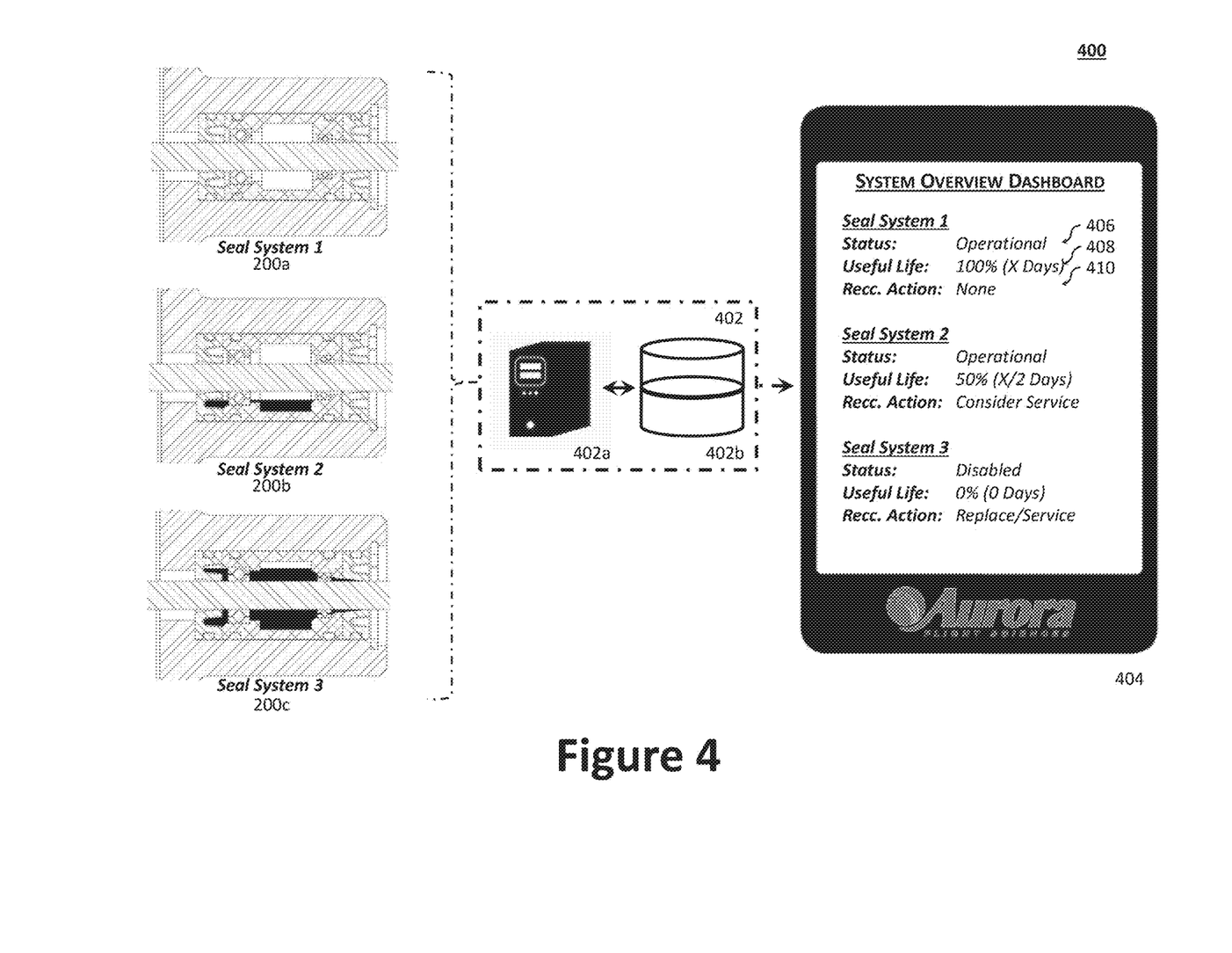
FIG. 4 illustrates a block diagram of an example seal monitoring system for use in connection with one or more shaft seal systems.

FIG. 4 illustrates an example, seal monitoring system 400 for a plurality of shaft seal systems 200 within one or more shaft systems 100. As illustrated, a plurality of shaft seal systems 200 (e.g., the one or more sensors thereof) may be communicatively coupled with a user terminal 404 via a shaft seal-monitoring server 402. The shaft seal-monitoring server 402 generally comprises a processor (e.g., computer 402a) configured to perform one or more algorithms/protocols and a non-transitory data storage device 402b. Sensor information from one or more sensors of the shaft seal systems 200 may be reported to the one or more user terminals 404, which may be portable user devices (e.g., a portable computer, tablet, smart phone, or other device).

The seal monitoring system 400 may employ one or more communication networks (e.g., the Internet) to facilitate communication between the various components of the seal monitoring system 400. Moreover, an encrypted communication channel, such as Secure Sockets Layer ("SSL"), may be employed to communicate data between, for example, the shaft seal systems 200 and the shaft seal-monitoring server 402. In addition to, or lieu of, the communication network, the one or more user terminals 404 may communicate directly with the shaft seal systems 200 or the seal monitoring system 400 via point-to-point communication (e.g., without requiring an intervening network or node).

As illustrated, the user terminal 404 may, in real-time (or near real-time) illustrate (e.g., via a display) the statuses of one or more seal systems (e.g., first, second, and third seal systems 200a, 200b, 200c). The statuses provided by the user terminal 404 (e.g., displayed on the display) may include, for each of one or more seal systems 200a, 200b, 200c, inter alia, the current status 406, the remaining useful life 408, and, where applicable, a recommended course of action 410. For example, the first seal system 200a is illustrated as a seal system with no leaked fluid within the leak chamber 218. The remaining useful life 408 may be illustrated as an icon or numerical scale, such as a percentage or remaining up-time, which may be presented in terms of remaining minutes, hours, and/or days. The current status 406 may be, for example, "operational," "disabled," "malfunction," etc. Accordingly, the status for the first seal system 200a may be, based on a sensor reading at the first seal system 200a, presented as "operational" with 100% remaining useful life (e.g., new or like new), and, therefore, no recommended action is needed because the remaining useful life 408 of the first seal system 200a is substantially new.

Turning to the second seal system 200b, the one or more sensors of the second seal system 200b indicate that the leak chamber 218 has taken on an amount of leaked fluid (e.g., via primary shaft seal 212), but that the amount of leaked fluid has not reached a predetermined volume. Accordingly, the status for the second seal system 200b may be, based on a sensor reading at the second seal system 200b, presented as "operational," but with only 50% remaining useful life. Since only 50% remaining useful life remains, the recommended course of action 410 may be to service the second seal system 200b. Service may include, for example, draining the leak chamber 218 via a value and/or replacing the primary shaft seal 212. While a pump system adds complexity, a pump system may nevertheless be incorporated to automatically drain the leak chamber 218. The pump could be made to automatically expel leaked fluid (e.g., through a valve) upon its detection above a pre-determined threshold inside the leak chamber.

Turning to the third seal system 200c, the one or more sensors of a third seal system 200c indicate that the leak chamber 218 has taken on a substantial amount of leaked fluid (e.g., via primary shaft seal 212) and that the amount of leaked fluid has reached a predetermined volume (e.g., a cut off volume). Accordingly, the status for the third seal system 200c may be, based on a sensor reading at the third seal system 200c, presented as "disabled" and with 0% useful life. Accordingly, the recommended action may be to service the third seal system 200c. Service may include, for example, draining the leak chamber 218 via a value and/or replacing the primary shaft seal 212 and/or the secondary shaft seal 204. While a pump system adds complexity, a pump system may nevertheless be incorporated to automatically drain the leak chamber 218.

Further, additional sensors may be positioned inboard (i.e., beyond the inboard support 202) to indicate failure of the secondary shaft seal 204. For example, if leaked fluid from the leak chamber 218 breaches the secondary shaft seal 204, an additional sensor, such as those described above in connection with the leak chamber 218, may be provided to indicate a change in pressure or moisture, which may then be relayed to the user terminal 404 via the shaft seal-monitoring server 402.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations can be ascertainable to those of skill in the art. Thus, it is to be understood that the invention may therefore be practiced otherwise than as specifically described above.

What is claimed is:

1. A shaft system having a cavity and an inboard support, the shaft system comprising:
   a retaining ring;
   a shaft seal system positioned within the cavity defined by said shaft system, the shaft seal system being positioned between said inboard support and said retaining ring,
   wherein the shaft seal system comprises a first ball bearing, a second ball bearing, a primary shaft seal, and a secondary shaft seal,
   wherein the secondary shaft seal is inboard with respect to said primary shaft seal,
   wherein said shaft seal system defines a leak chamber between said primary shaft seal and a secondary shaft seal,
   wherein the leak chamber includes one or more sensors to monitor a parameter of the shaft seal system, and
   wherein said shaft seal system includes a plurality of O-rings between an outer surface of said shaft seal system and said shaft system.

2. The shaft system of claim 1, wherein the shaft seal system includes a housing for said first ball bearing and said second ball bearing.

3. The shaft system of claim 1, wherein the primary shaft seal and the secondary shaft seal are fabricated from an elastomer.

4. The shaft system of claim 3, wherein the elastomer include one or more elastomers chosen from a group of FKM, ACM, NBR, HNBR, AEM, PTFE, PEEK, TPU, EPDM, and MVQ.

5. The shaft system of claim 1, wherein the one or more sensors includes a leak sensor or pressure sensor.

6. The shaft system of claim 5, wherein the seal monitoring system is communicatively coupled with a user terminal.

7. The shaft system of claim 6, wherein the user terminal is a portable user device.

8. The shaft system of claim 7, wherein the user terminal displays a status of a plurality of seal systems.

9. The shaft system of claim 8, wherein the status includes a current status, a remaining useful life, and a recommended course of action.

10. The shaft system of claim 6, wherein the seal monitoring system is communicatively coupled with the user terminal via the Internet.

11. The shaft system of claim 5, further comprising a pump configured to drain fluid from the leak chamber.

12. The shaft system of claim 11, wherein the pump is configured to drain fluid from the leak chamber automatically as a function of the parameter.

13. The shaft system of claim 1, wherein the parameter of the shaft seal system is communicated to a seal monitoring system.

14. A shaft seal system for use in a shaft system, the shaft seal system comprising:
a first ball bearing;
a second ball bearing;
a primary shaft seal; and
a secondary shaft seal,
wherein the secondary shaft seal is inboard with respect to said primary shaft seal,
wherein said shaft seal system defines a leak chamber between said primary shaft seal and a secondary shaft seal,
wherein the leak chamber includes one or more sensors to monitor a parameter of the shaft seal system, and
wherein said shaft seal system includes a plurality of O-rings between an outer surface of said shaft seal system and said shaft system.

15. The shaft seal system of claim 14, wherein the shaft seal system comprises a housing.

16. The shaft seal system of claim 15, wherein the housing houses said first ball bearing and said second ball bearing.

17. The shaft seal system of claim 14, wherein the primary shaft seal and the secondary shaft seal are fabricated from an elastomer, wherein the elastomer include one or more elastomers chosen from a group of FKM, ACM, NBR, HNBR, AEM, PTFE, PEEK, TPU, EPDM, and MVQ.

18. The shaft seal system of claim 14, wherein the parameter of the shaft seal system is communicated to a seal monitoring system that is communicatively coupled with a user terminal to display a status of a plurality of seal systems.

19. The shaft seal system of claim 14, further comprising a pump configured to drain fluid from the leak chamber.

20. The shaft seal system of claim 19, wherein the pump is configured to drain fluid from the leak chamber automatically as a function of the parameter.

* * * * *